May 9, 1950     W. L. McGRATH     2,506,728
JOINT
Filed March 16, 1945
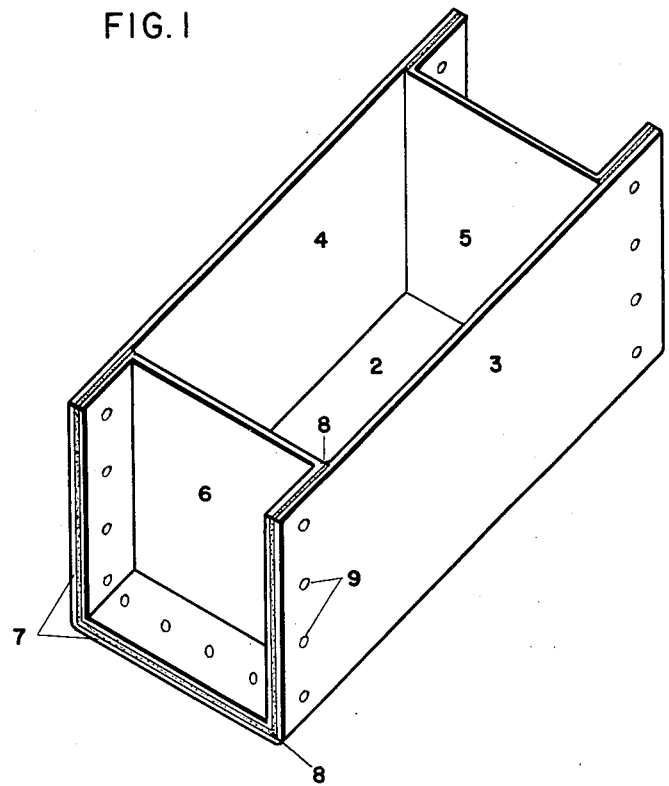
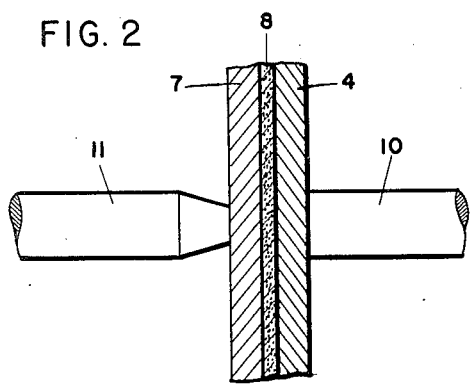
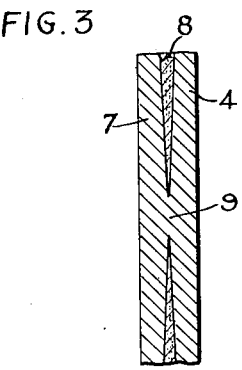
INVENTOR.
William L. McGrath
BY Herman Bend
Attorney Patented May 9, 1950

2,506,728

UNITED STATES PATENT OFFICE 2,506,728

JOINT

William L. McGrath, Syracuse, N. Y., assignor to Carrier Corporation, Syracuse, N. Y., a corporation of Delaware Application March 16, 1945, Serial No. 583,160

3 Claims. (Cl. 189—36)

1

This invention relates to a method of forming a liquid and gas impervious joint and to the structure so provided.

In the manufacture of various metal assemblies, such as plenum boxes, for example, it has been found extremely difficult to obtain satisfactory joints by spot-welding for the seam or joint how was not secure and liquid and gas leakage frequently occurred. Seam welding is not satisfactory for this type of assembly due to the difficulties involved in fabricating irregular shapes, welding corners and the like, while arc welding, as by hand along the flanges, is so expensive as to be commercially prohibitive.

The chief object of my invention is to provide a method of making a liquid and gas impervious seam or joint between overlapped sections of metal.

An object of my invention is to provide a method of joining together adjacent sections of metal in such manner that a spot weld is formed at predetermined points and a material is caused to flow over desired areas to bring about required binding in the nature of a soldering action between the metals to be joined.

A further object of my invention is to provide a method of making a liquid and gas impervious seam or joint between overlapped sections of metal in which a layer of conductive material is interposed between adjacent metal surfaces, which is capable of setting or vulcanizing to render the seam or joint substantially gas and liquid impervious, and which is capable of conducting an electric current between such metal surfaces to enable spot welds to be formed between the same.

A still further object of my invention is to provide a joint or seam connecting adjacent metal surfaces which is substantially liquid and gas impervious, and which forms an integral structure.

A still further object is to provide a joint or seam in which the adjacent metal surfaces are bonded together by a conductive compound capable of setting or vulcanizing to render the juncture of such surfaces substantially liquid and gas impervious and in which the adjacent metal surfaces are welded into an integral structure by means of spot welds disposed at spaced points along such surfaces.

2

This invention relates to a method of forming substantially liquid and gas impervious joints between overlapped sections of metal in which a plastic sealing compound is interposed between adjacent metal surfaces, such compound including a conductive material, such as iron or copper filings, conductive carbon black or the like, homogeneously dispersed therethru, which permits the adjacent metal sections to be joined together by the application of a welding current or by the use of high frequency current applied to electrodes, suitably positioned on both sides of the metal sections. By the practice of my invention, spot welding may be carried on in the usual manner while, at the same time setting or vulcanizing the plastic conductive compound disposed in areas adjacent to spot welds due to the flow of current through the conductive coating. Thus, there is provided a joint affording the advantages of a plastic compound adapted to be set in a seam or joint to bond adjacent metal sheets, plates or similar pieces together to assure a substantially liquid and gas impervious seal and in which such adjacent sheets may be spot welded together through the conducting compound to form a rugged, integral structure capable of withstanding strains and stresses.

The attached drawing illustrates a preferred embodiment of my invention, in which—

Fig. 1 is an isometric view of a metal box embodying the joint or seam of my invention; and Fig. 2 is a sectional view through overlapped sections of metal, illustrating the manner of forming the joint of my invention, and Figure 3 is a sectional view through overlapped sections of metal illustrating the formed joint.

Referring to the drawing, there is disclosed a metal box, such as a plenum box, including a base 2, metal sides 3 and 4, and end portions 5 and 6. The end portions 5 and 6 are provided with flanges 7 adapted to be spot welded to the sheets or plates composing sides 3 and 4 and to the base 2. Interposed between the adjacent metal surfaces, such as the flanges 7 and the ends of base 2 and sides 3 and 4, in proximity thereto is a layer or coating 8 of a conductive compound, more fully described hereinafter. This conductive compound is interposed between the adjacent metal surfaces while in plastic condition, the adjacent metal surfaces are then pressed securely together ensuring an even coating of conductive compound there-between, and are spot welded as shown at 9 to form an integral structure. The heat of the welding operation sets or vulcanizes the coating in areas adjacent thereto.

It is essential in my invention that the compound or coating interposed between the adjacent metal surfaces include a conductive material in order to permit proper formation of spot welds 9. Such conductive material may be iron filings, copper filings, conductive carbon black, such as acetylene black, or similar material, preferably homogeneously dispersed throughout the compound for satisfactory results.

In forming the structure described above, a thin layer or coating 8 of conductive adhesive may be spread along metal surface 7 and adjacent metal surface 4 pressed in contact therewith to form a substantially impervious liquid and gas seal there-between, and such metal surfaces may be spot welded together as shown at 9, by disposing them between electrodes 10 and 11 of a spot welding machine. The heat of the welding operation assures setting or vulcanizing of the compound in areas adjacent thereto. It will be understood an additional quantity of compound may be placed in the corners of the structure shown, if desired, in order to assure a satisfactory bond and a secure seal at such corners. The conductive adhesive coating provides a strong bond between the metal sections, and thus relieves any strain during the welding operation. In addition, it appears that such coating exerts an insulating action to some extent and concentrates the heat of the welding operation at a desired spot. In any event, use of my invention enables a stronger and more secure integral structure to be obtained, in which the seams or joints are substantially gas and liquid impervious.

Any suitable conductive adhesive may be used as described above. I have found certain compounds, hereinafter described, are highly desirable for this use since they assure an impervious bond between adjacent metal surfaces and permit satisfactory spot welding to be obtained thereby forming a strong, integral structure. I may use, for example, a "Neoprene" (polymerized chloroprene) base adhesive, such as 3M #711 adhesive, or EC 164 adhesive, a remilled rubber base adhesive, both manufactured by the Minnesota Mining and Manufacturing Company. In such an adhesive, may be included 5% to 50% by weight of conductive material, such as electrolytic iron filings, copper filings, acetylene black or the like. Preferably, the conductive material is in the form of a powder having a particle size smaller than 100 mesh/inch. The conductive material is preferably homogeneously dispersed throughout the adhesive, and the compound is ready for application. Concentrations of conductive material greater than 50% by weight are not used, and are unsatisfactory, since flash may be obtained in the welding operation.

If desired, other suitable adhesives may be used, such as Minnesota Mining and Manufacturing Company's #504 adhesive, a "Thiokol" (ethylene tetra-sulphide polymer) base material, water soluble asphalt emulsions containing zinc chromate as a corrosion inhibitor, or "Tygonite" (a rubber-like resinous material) manufactured by the United States Stoneware Company of Akron, Ohio. It will be appreciated a suitable conductive material is added to such adhesives in the manner described above in order to render the various compositions satisfactory for use in my invention.

Other solder-like paste compounds may be used, if desired, which are capable of flow under heat created by the welding operation to bind the metal surfaces to be joined thus creating a gas and liquid impervious seal while a strong, integral structure is formed by the spot welds.

Practice of the method of my invention reduces the costs involved in forming joint structures, as described herein, as well as expedites considerably the speed of production. The provision of the conductive layer or coating does not interfere with the spot welding operation but, in fact, aids in attainment of satisfactory spot welds. I have found in practice, with zinc-coated metal sheets, for example, that the tensile strength in shear of the seam or joint of my invention greatly exceeds the tensile strength in shear of structures heretofore obtainable solely by spot welding. The provision of the conductive layer protects the adjacent metal surfaces against corrosion. My invention does not require corrections in the amount of heat, amount of current or timing, but may be practiced in accordance with customary procedure in spot welding.

While I have described and illustrated a preferred embodiment of my invention, it will be understood that my invention is not limited thereto, since it may be otherwise embodied within the scope of the following claims.

I claim:

1. A joint comprising a plurality of overlapped metal elements, an electric current conductive layer interposed between said elements rendering the joint liquid and gas impervious, said layer comprising the dried residue of an adhesive selected from the group consisting of rubber solutions and synthetic rubber solutions, and having electrolytic metal powder having a particle size less than 100 mesh/inch dispersed therethru, said metal powder being present in an amount falling within the range of 5% to 50% by weight of the adhesive before drying, and a plurality of spot welds spaced along the joint and extending through said layer for holding said elements together.

2. A joint comprising a plurality of overlapped metal elements, an electric current conductive layer interposed between said elements rendering the joint liquid and gas impervious, said layer comprising the dried residue of an asphalt emulsion containing a corrosion inhibitor and electrolytic iron filings having a particle size less than 100 mesh/inch dispersed therethrough, said filings being present in an amount falling within the range of 5% to 50% by weight of the emulsion before drying, and a plurality of spot welds spaced along the joint and extending through said layer for holding said elements together.

3. In a plenum box the combination of a base, side portions, end portions, each end portion having vertically extending flanges thereon adapted to be disposed adjacent the side portions, and a horizontally extending flange adapted to be disposed adjacent the base portion, an electric current conductive layer disposed between the side portions and said vertically extending flanges and between the base and the horizontally extending flange rendering the joint therebetween liquid and gas impervious, said layer comprising the dried residue of an adhesive selected from the group consisting of rubber solutions and synthetic rubber solutions, and having an electrolytic iron powder having a particle size less than 100 mesh/inch dispersed therethrough, said iron powder being present in an amount falling within the range of 5% to 50% by weight of the adhesive before drying, and a plurality of spot welds securing the flanges to the side portions and the base thereby forming a strong integral structure.

WILLIAM L. McGRATH.

REFERENCES CITED

The following references are of record in the file of this patent:

UNITED STATES PATENTS

| Number | Name | Date |
|---|---|---|
| 572,234 | Windle | Dec. 1, 1896 |
| 1,960,120 | Mohring | May 22, 1934 |
| 2,137,623 | Mussey | Nov. 22, 1938 |
| 2,204,617 | Peel et al. | June 18, 1940 |
| 2,243,832 | Bohn | June 3, 1941 |

FOREIGN PATENTS

| Number | Country | Date |
|---|---|---|
| 825,910 | France | Dec. 16, 1937 |
| 558,124 | Great Britain | Dec. 22, 1943 |